(12) United States Patent
Metten et al.

(10) Patent No.: US 11,291,971 B2
(45) Date of Patent: Apr. 5, 2022

(54) PULSED FLOW REACTOR AND USE THEREOF

(71) Applicants: AJINOMOTO OMNICHEM, Wetteren (BE); ECOSYNTH, Deinze (BE)

(72) Inventors: Bert D F Metten, Lokeren (BE); Koen Toye, Bissegem (BE); Koen Jeanne Alfons Van Aken, Kuurne (BE); Wouter Debrouwer, Beernem (BE)

(73) Assignees: AJINOMOTO OMNICHEM, Wetteren (BE); ECOSYNTH, Deinze (BE)

( * ) Notice: Subject to any disclaimer, the term of this patent is extended or adjusted under 35 U.S.C. 154(b) by 0 days.

(21) Appl. No.: 17/058,614

(22) PCT Filed: May 24, 2019

(86) PCT No.: PCT/EP2019/063522
§ 371 (c)(1),
(2) Date: Nov. 24, 2020

(87) PCT Pub. No.: WO2019/224376
PCT Pub. Date: Nov. 28, 2019

(65) Prior Publication Data
US 2021/0205776 A1 Jul. 8, 2021

(30) Foreign Application Priority Data

May 25, 2018 (BE) .................................. 2018/5338

(51) Int. Cl.
*B01J 19/00* (2006.01)
*B01J 19/24* (2006.01)

(52) U.S. Cl.
CPC ......... *B01J 19/0093* (2013.01); *B01J 19/006* (2013.01); *B01J 19/241* (2013.01);
(Continued)

(58) Field of Classification Search
CPC .................... B01J 19/241; B01J 19/185; B01J 2219/00074; B01J 2219/00096;
(Continued)

(56) References Cited

U.S. PATENT DOCUMENTS

| 10,449,509 B2 | 10/2019 | Blum et al. |
| 2012/0122224 A1 | 5/2012 | Schael et al. |

(Continued)

FOREIGN PATENT DOCUMENTS

| CN | 107177500 A | 9/2017 |
| DE | 10209898 A | 9/2003 |

(Continued)

OTHER PUBLICATIONS

Machine Translation of WO 2014044624 (Year: 2014).*
(Continued)

*Primary Examiner* — Lessanework Seifu
(74) *Attorney, Agent, or Firm* — Christensen O'Connor Johnson Kindness PLLC

(57) ABSTRACT

A planar flow reactor includes a straight planar process channel, a flow generator, and a plurality of static mixing elements disposed within the process channel. The flow generator is configured to generate a pulsatile flow within the process channel, and the static mixing elements are configured to locally split and recombine the flow. The straight planar process channel enables the generation of a flow pattern that is largely independent of the width of the process channel, meaning that the throughput may be increased by increasing the width without significantly affecting the residence time distribution or the flow behavior. Furthermore, by creating a pulsatile flow within the process channel, turbulence and/or chaotic fluid flows may be generated even at low net flow rates, i.e. low net Reynolds numbers.

31 Claims, 7 Drawing Sheets

(52) U.S. Cl.
CPC .............................. *B01J 2219/009* (2013.01);
*B01J 2219/00074* (2013.01); *B01J 2219/0086*
(2013.01); *B01J 2219/00164* (2013.01); *B01J
2219/00768* (2013.01); *B01J 2219/00777*
(2013.01); *B01J 2219/00783* (2013.01); *B01J
2219/00831* (2013.01); *B01J 2219/00833*
(2013.01); *B01J 2219/00837* (2013.01); *B01J
2219/00873* (2013.01); *B01J 2219/00889*
(2013.01); *B01J 2219/00894* (2013.01); *B01J
2219/00907* (2013.01); *B01J 2219/00934*
(2013.01)

(58) Field of Classification Search
CPC .... B01J 2219/00164; B01J 2219/00777; B01J
2219/00783; B01J 2219/00833; B01J
2219/00831; B01J 2219/00889; B01J
2219/00894; B01J 2219/00907; B01J
2219/009; B01J 2219/00934; B01J
2219/00936; B01J 2219/00943
See application file for complete search history.

(56) References Cited

U.S. PATENT DOCUMENTS

| | | |
|---|---|---|
| 2014/0050630 A1 | 2/2014 | Asano et al. |
| 2015/0273430 A1* | 10/2015 | Roelands .............. B01F 5/0647 366/341 |
| 2018/0161747 A1* | 6/2018 | Lavric .................... F28F 13/06 |

FOREIGN PATENT DOCUMENTS

| | | | |
|---|---|---|---|
| EP | 0540180 | A1 | 5/1993 |
| EP | 0631809 | A1 | 1/1995 |
| EP | 1076597 | A1 | 2/2001 |
| FR | 3042793 | A1 | 4/2017 |
| WO | 8700079 | A1 | 1/1987 |
| WO | 99/55457 | A1 | 11/1999 |
| WO | 2008047166 | A2 | 4/2008 |
| WO | 2012/025224 | A | 3/2012 |
| WO | WO 2014044624 | * | 3/2014 |
| WO | 2015/148279 | A | 10/2015 |
| WO | WO 2017072190 | * | 5/2017 |
| WO | 2017/175207 | A1 | 10/2017 |

OTHER PUBLICATIONS

International Search Report dated Jul. 2, 2019, issued in corresponding International Application No. PCT/EP2019/063522, filed May 24, 2019, 4 pages.

Written Opinion of the International Searching Authority dated Jul. 2, 2019, issued in corresponding International Application No. PCT/EP2019/063522, filed May 24, 2019, 9 pages.

A. P. Harvey, et al., "Operation and Optimization of an Oscillatory Flow Continuous Reactor", Ind. Eng. Chem. Res. 2001, 40, pp. 5371-5377.

* cited by examiner

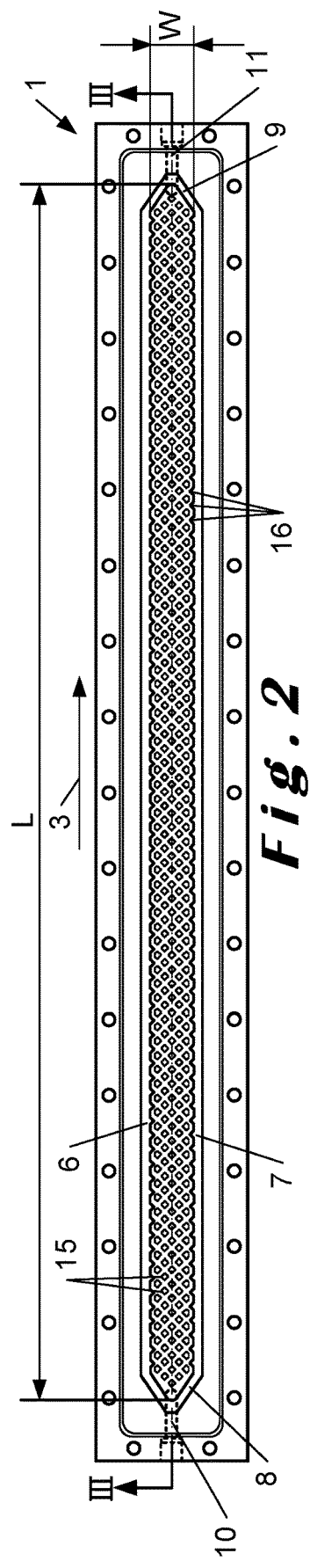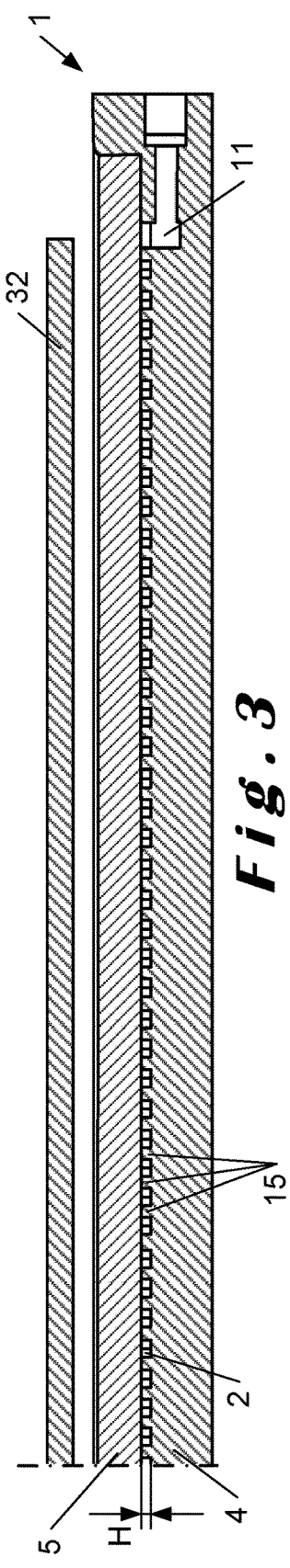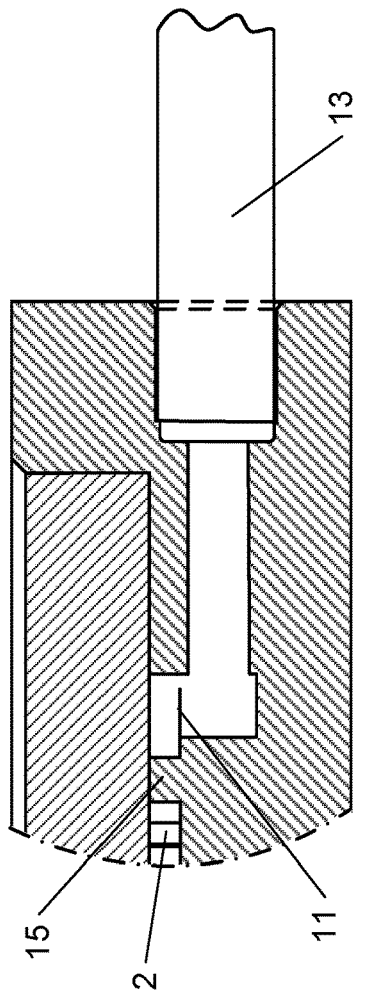

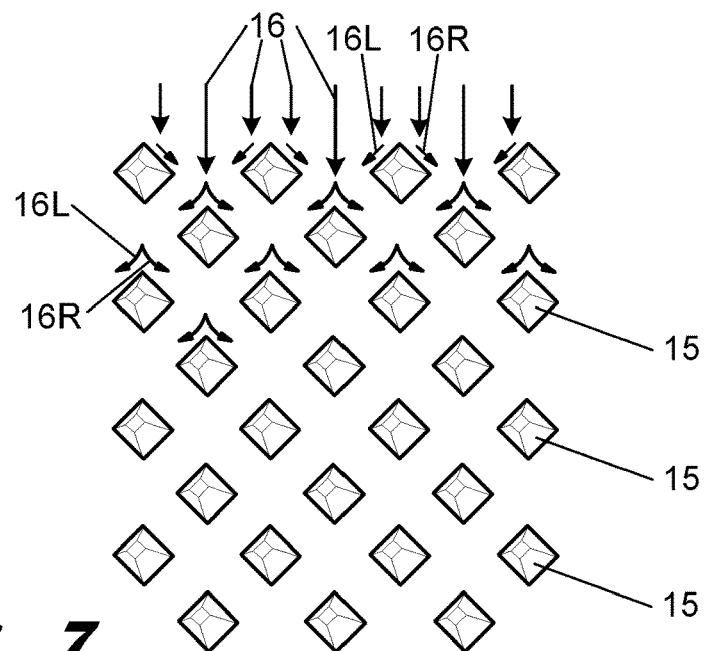
Fig. 7
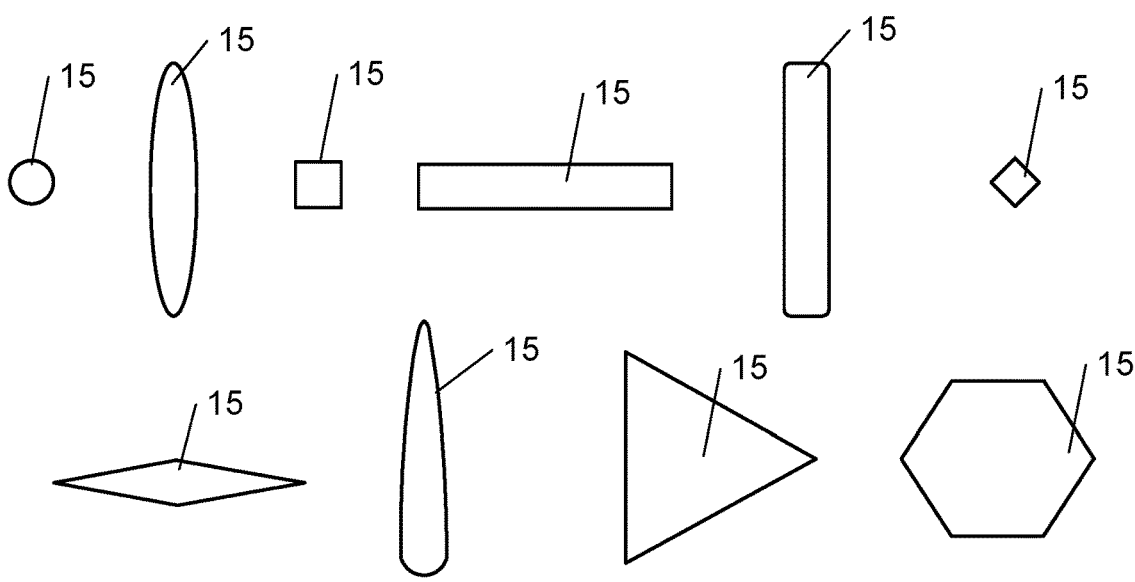
Fig. 8A-j
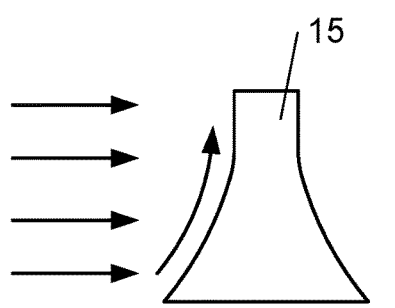
Fig. 9A
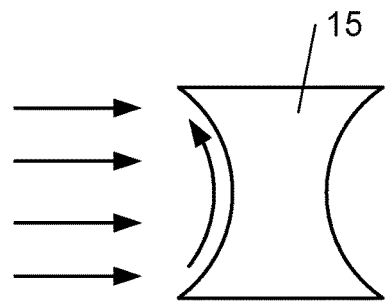
Fig. 9B

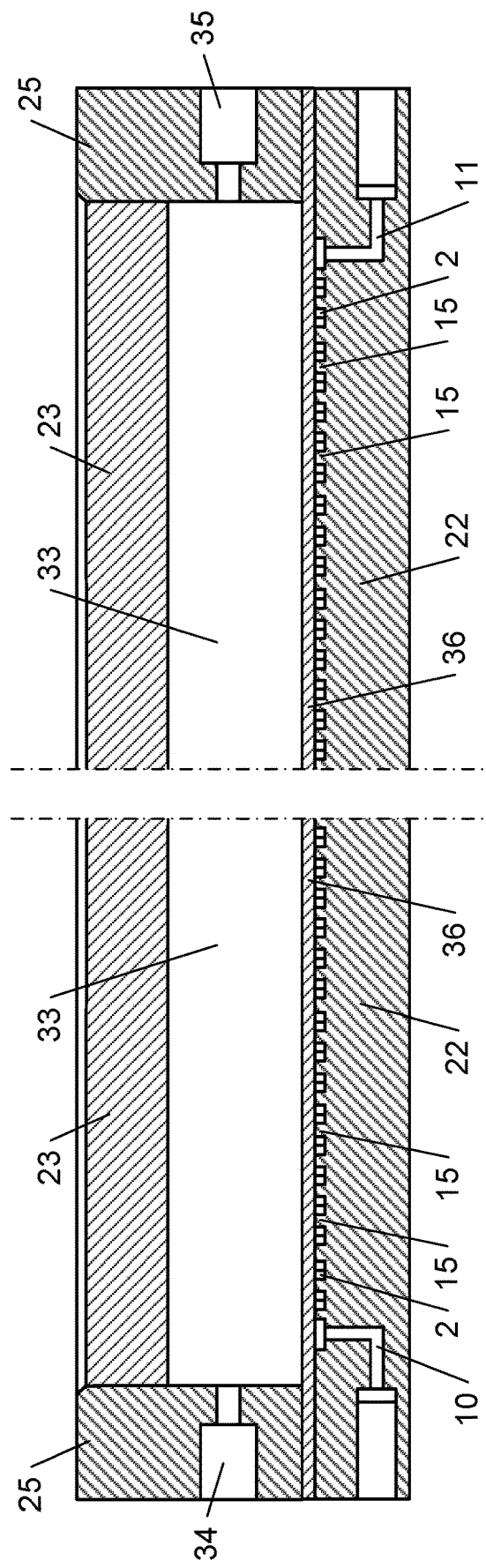

PULSED FLOW REACTOR AND USE THEREOF

TECHNICAL FIELD

The present invention relates to a planar flow reactor and in particular to a flow reactor suitable for multiphasic reactions and/or photochemical processes. The present invention also relates to a use of the flow reactor to produce a product stream and to a method for producing a product stream using the flow reactor.

BACKGROUND ART

Continuous manufacturing is often the most cost-effective and efficient way to produce goods. This technology was originally developed for the production of very high volumes of end products, for example in the petroleum and food industries. However, in recent times, continuous manufacturing has also been used for low volume production, for example in the chemical and pharmaceutical industries, as other benefits (e.g. safety, quality, mass and heat transfer, etc.) became apparent. Especially in the pharmaceutical industry, regulatory agencies (e.g. the FDA) prefer a switch from batch to continuous processing of active pharmaceutical ingredients (APIs). Optimized dedicated systems have been developed for continuous production of specific APIs. However, on laboratory and pilot scale, it is impractical and expensive to design and implement a suitable reactor for every specific process.

In view of this issue, a wide variety of laboratory flow reactors have been developed. Most of these laboratory reactors utilize (coiled) tubing, narrow channels or falling films of which it is known that these are difficult to scale-up. Specifically, increasing the internal volume by increasing the tube diameter or the channel cross-section results in a deteriorated process control, i.e. mass transfer, heat exchange and/or flow hydrodynamics become more difficult to control. Furthermore, increasing the tube or channel length increases the pressure drop over the length of the reactor.

The scale-up issues associated with these types of flow reactors were addressed, but not solved, in WO-A-2012/025224 which proposes a flow reactor having a planar process channel delimited by a bottom wall, a top wall and two side walls. The process channel is provided with an inlet to introduce a feed stream into the process channel and an outlet to discharge the product stream therefrom. Between the inlet and outlet, the process channel has a meander pattern, i.e. a serpentine flow reactor, which provides the necessary length of the process channel while limiting the external size of the flow reactor, which is especially beneficial for laboratory flow reactors in view of the limited available space in a laboratory. Furthermore, a plurality of static mixing elements are disposed within the process channel to locally split and recombine the fluid flow.

WO-A-2012/025224 further aims to improve the residence time distribution (RTD) of the fluid flowing through the process channel, i.e. the RTD is preferably as narrow as possible. The improvement of the RTD is achieved by reducing the dead volume of the process channel and this may be done in two ways.

In the first way disclosed in WO-A-2012/025224, the shape of the static mixing elements may be chosen to provide long laminar boundary layer flows, e.g. by using circular, elliptical or wing-shaped static mixing elements, which avoid a dead volume directly behind a static mixing element. However, this has the disadvantage that different fluids typically have a different viscosity which affects the extent of the laminar boundary layer flows generated by a specific shape of static mixing element. As such, when the flow reactor is used for different reactions, as is typically the case in a laboratory environment, the static mixing elements may need to be replaced with a different set to achieve the reduced dead volume, which is essential to control the RTD. As the mixing elements are an integral part of the flow reactor, such a replacement is not possible. Furthermore, it may even be that an entirely new shape needs to be designed for a specific fluid, which may require extensive modelling and/or simulations. Moreover, the laminar boundary layer flows provide less mixing of the fluid within the reactor.

In the second way disclosed in WO-A-2012/025224, high flow rates, i.e. a flow having a relatively high Reynolds number, may be used to create a turbulent flow which causes turbulence behind a static mixing element thus also avoiding a dead volume. Although an effective mixing can be achieved in this way, this has the disadvantage that the flow reactor needs to be sufficiently long for the fluid to have the desired residence time. Therefore, the serpentine reactors may be placed in series with the different plates of the reactor being stacked onto one another thereby creating the required length, but, as also disclosed in WO-A-2012/025224, the longer the process channel, the higher the pressure drop becomes, which is undesirable and in many cases exceed the pressure limit of the reactor or auxiliaries like pumps. Moreover, an already quite long laboratory reactor takes away the option of scaling-up by placing multiple reactors in series as the pressure drop cannot be controlled sufficiently to have a narrow RTD.

Another downside of the serpentine flow reactor disclosed in WO-A-2012/025224 is that the static mixing elements create very narrow fluid passages between them, typically having a dimension in the sub-millimetre range, i.e. the static mixing elements form micro-fluidic channels. Such small channels provide only a limited useable reactor volume (e.g. according to the disclosure in WO-A-2012/025224 the mixing elements take up between 40% and 60% of the total process channel volume) which naturally limits production capacity per channel. Moreover the channel volume per plate is then limited e.g. between 5 and 40% per plate. While WO-A-2012/025224 discloses that multiple serpentine flow reactors may be placed in parallel to scale-up the production capacity, the low volume of the micro-fluidic channels effectively reduces the production capacity by such an amount that the number of flow reactors needed for actual production becomes high, which leads to issues in process control, i.e. it becomes very difficult to monitor and control the process parameters in the various parallel flow reactors which may lead to quality differences between the product streams of the various parallel reactors.

It is also known in the art to provide flow reactors having a planar process channel which are totally transparent or have parts that are transparent. Transparency is typically desired for visual inspection and is required for photochemical reactions. For example, WO-A-2015/148279 discloses a transparent modular serpentine flow reactor having a central planar process fluid layer and two outer planar thermal control fluid layers. The process channel forms a microchannel which follows a meander pattern. Similar serpentine flow reactors are disclosed in US-A-2014/050630, DE-A-10209898 and US-A-2012/122224.

A downside of these flow reactors is that the small volume of the process channel is problematic for high-throughput. Moreover, the single microchannel that forms the process channel may easily get blocked due to clogging, which blockage may lead to a failure of the flow reactor. In addition, employing solids (e.g. catalysts, reagents, etc.) is difficult in single process channels in the sub-millimetre range.

Another disadvantage of the serpentine flow reactors is that the channel volume and thus also the surface per plate is limited to less than 50% and in many cases to less than 10%. Larger surfaces are especially important in the case of photochemical reactors since most photons are wasted on wall material instead of reaction fluids.

Another disadvantage of the serpentine flow reactors is that they cannot easily be scaled up by increasing the cross-sectional size of the process channel since such a scale-up generates a different hydrodynamic behavior, especially as a result of the curves. Specifically, due to the presence of curves, the cross-sectional size of the process channel can be increased by expanding the plate reactor in two dimensions, which automatically also increases the length of the process channel. As a result, in order to obtain the same residence time for the reaction, the flow rate has to be increased, thus affecting the hydrodynamic behavior of the flow.

In the art there have also been studies of other ways to influence the generation of turbulence in flow reactors. For example, the paper by A. P. Harvey, M. R. Mackley and P. Stonestreet titled "*Operation and optimization of an oscillatory flow continuous reactor*", Ind. Eng. Chem. Res. 2001, 40, 5371-5377 discloses a tubular process channel with periodically spaced baffles, i.e. annular obstructions extending from the wall of the process channel inwards. A net flow is generated through the process channel in combination with an oscillatory flow, i.e. a pulsatile flow is generated. The oscillatory flow results in a turbulent flow even for a moderate speed net flow, i.e. a net Reynolds number of around 100 with an oscillatory Reynolds number of 100 to 1000. Consequently, long residence times are possible with a process channel having a reduced length-to-diameter ratio. EP-A-0540180, WO-A-2008/047166, WO-A-87/00079 and EP-A-0631809 each disclose a similar flow reactor having a tubular process channel with periodically spaced baffles.

However, as already described above, it is not easy to scale-up such a tubular process channel. In particular, increasing the diameter results in a deteriorated process control, while increasing the channel length also increases the pressure drop.

WO-A-2017/175207 discloses a plate reactor with a serpentine process channel having periodically baffled side walls. A pulsatile flow is generated to induce turbulence to improve the mixing of the fluid within the process channel.

Upscaling the flow reactor disclosed in WO-A-2017/175207 is not straightforward for several reasons. First, as described above, the serpentine layout of the process channel means that upscaling the reactor will increase its length. As such, in order to obtain the same residence time for the reaction, the flow rate has to be increased, thus affecting the hydrodynamic behavior of the flow. Second, varying the cross-section of the process channel (e.g. increasing the width) results, as for a tubular process channel, in a deteriorated process control. Moreover, varying the cross-section of the process channel may also lead to changes in the baffle shape and/or periodicity.

DISCLOSURE OF THE INVENTION

It is an object of the present invention to provide a flow reactor having improved scalability.

This object is achieved according to the present invention with a flow reactor comprising: a substantially straight planar process channel having a longitudinal direction and being delimited by a bottom wall, a top wall, two side walls, a first end wall and, a second end wall which is opposite to said first end wall along said longitudinal direction, the process channel comprising at least one inlet at said first end wall configured to introduce at least one feed stream into said process channel and at least one outlet at said second end wall configured to discharge at least one product stream from said process channel; a flow generator configured to generate a pulsatile flow within said process channel, the pulsatile flow comprising a unidirectional net flow through said process channel along said longitudinal direction and an oscillatory flow superposed on said net flow; and a plurality of static mixing elements disposed within said process channel and configured to locally split and recombine said flow. The static mixing elements are in other words each configured to split the flow approaching the mixing element into at least two streams, one of which passes the mixing element along one side of the mixing element, in particular along the right side thereof, and the other one of which passes the mixing element along the opposite side of the mixing element, in particular along the left side thereof.

By providing a substantially straight planar process channel through which a net unidirectional flow can be generated from the inlet to the outlet, a flow pattern is generated that is largely independent of the width of the process channel. In other words, changing the width of the process channel has no significant influence on the flow pattern within the process channel in case the flow parameters of the pulsatile flow (e.g. the flow velocity and oscillation centre-to-peak amplitude) are kept constant. Consequently, process parameters and resulting reactor performance, such as the RTD, are largely unaffected when varying the width of process channel. As such, in order to scale-up the flow reactor, the width of the flow reactor can be enlarged, thus providing a larger volume and thus a larger throughput, i.e. an increase in production capacity, without significantly affecting process parameters such as the pressure drop and the flow behaviour and, as a consequence, the RTD, mass and/or heat transfer.

Furthermore, by creating a pulsatile flow, i.e. a resultant periodic flow of the superposition of a unidirectional net flow along said process channel and a periodic oscillatory flow, irrespective of the amplitude of the oscillatory flow, within the process channel, turbulence and/or chaotic fluid flows may be generated even at low net flow rates, i.e. low net Reynolds numbers, without requiring a large volume of static mixing elements, thereby losing a relatively large portion of the reactor volume, as in the serpentine flow reactor disclosed in WO-A-2012/025224. Therefore, the size and/or placement of the static mixing elements can be modified, without decreasing the needed turbulence, thus resulting in an increase in the maximal fluid volume within the process channel, thereby increasing the production capacity.

Moreover, the higher level of turbulence created by the oscillatory flow component also has advantages, such as an improvement in the RTD and the generation of a sufficient and/or increased mixing of the fluid within the process channel. The sufficient and/or increased mixing is advantageous in most reactions or unit operations and in particular for multiphasic reactions and/or photochemical processes. In case of multiphasic reactions the higher level of turbulence created by the oscillatory flow component creates remixing and constant redispersion of the immiscible phases thus creating larger surface areas that improve overall mass transfer.

While a pulsatile flow is known in the art as described above, such a flow is typically used for cylindrical process channels provided with baffles, i.e. local constrictions of the channel in the form of annular rings (orifices) such as disclosed in EP-A-0540180, WO-A-2008/047166, WO-A-87/00079 and EP-A-0631809. Also the reactor disclosed in WO-A-2017/175207 utilizes local constrictions applied to the side walls, i.e. no static mixing elements are used. Consequently, a person skilled in the art would not consider generating a pulsatile flow within the known planar serpentine flow reactor disclosed in WO-A-2012/025224 which is provided with static mixing elements to create the required turbulence.

In an embodiment of the present invention, said flow generator is configured to generate said pulsatile flow with a normalised oscillatory Reynolds number that is at least 5v, preferably at least 25v, more preferably at least 50v, advantageously at least 75v and most advantageously at least 100v, where v is the kinematic viscosity of the material in the process channel. Advantageously, said flow generator is configured to generate said pulsatile flow with a velocity ratio of at least 1, preferably at least 5, more preferably at least 10, advantageously at least 15 and more advantageously at least 20, where the velocity ratio is the ratio of the oscillatory Reynolds number to the net Reynolds number and is given by $2\pi f x_0/u$ where u is the velocity of the net flow component, f is the frequency of the oscillatory flow component and $x_0$ is the centre-to-peak amplitude of the oscillatory flow component. Advantageously, said flow generator is configured to generate said pulsatile flow with a normalised net Reynolds number that is at most 200 v, preferably at most 100v, more preferably at most 50v, most preferably at most 20v, advantageously at most 10v, more advantageously at most 5v and most advantageously at most 0.5v, where v is the kinematic viscosity of the material in the process channel.

It has been found that a flow having such high normalised oscillatory Reynolds numbers (i.e. having an oscillatory Reynolds number that is at least 5 irrespective of the viscosity of the fluid within the process channel) is subject to turbulence and/or chaotic motions even for relatively low net flow rates. In other words, a sufficiently mixed flow can still be obtained even when the net flow rate as required by the RTD for a fixed reactor length is low (i.e. in case a relatively long residence time is required) as the oscillatory Reynolds number can be easily increased. Consequently, for processes requiring a large residence time, the reactor length can still be kept relatively short as low net flow rates are now feasible with sufficient mixing.

In an embodiment of the present invention, said mixing elements are further configured to generate vertical vortices within said flow.

Such vertical vortices further increase the turbulence and/or chaotic fluid behaviour, thereby improving various aspects, such as the mixing of the fluid, the RTD, mass and/or heat transfer and film renewal at the top wall.

In an embodiment of the present invention, said top wall comprises at least one transparent part, said transparent part being preferably manufactured from one of: laboratory glass (e.g. borosilicate, Pyrex®, Vycor®), fused silica, quartz and polymers, such as PMMA, COC, etc.

In this embodiment the flow reactor is also suitable for photochemistry, i.e. reactions that are triggered by irradiation (e.g. UV or visible light) as the necessary rays can now penetrate the top wall to irradiate the flow within the process channel. Furthermore, the transparency of the top wall allows for a visual inspection of the reaction and/or process within the process channel. Consequently, it can be visually observed whether there is adequate mixing in for example liquid-liquid reactions of immiscible fluids and/or other multiphasic reaction mixtures. Similarly, it can be visually checked whether precipitation occurs as desired (e.g. in crystallisations) or whether solid particles (e.g. heterogeneous catalysts) are smoothly transferred through the reactor channel. It is also possible to visually check for one or more areas within the process channel whether unexpected precipitation or clogging has occurred.

In a preferred embodiment of the present invention, a transparent protective cover is provided on the inside of said top wall, said protective cover protecting at least said transparent part, said protective cover comprising, in particular, a polyfluorinated material.

In this way at least the transparent parts are protected from potential chemical damage that may result from the process streams within the process channel. In addition, said transparent protective cover can act as a protective barrier that prevents leaching of any material into the reaction. The protective cover may be conveniently replaced when needed.

In a further preferred embodiment of the present invention, the flow reactor further comprises at least one irradiation source configured to irradiate the material inside the process channel through said transparent part, preferably at least one cooling means being provided configured to cool said irradiation source, preferably to cool the region between said irradiation source and said transparent part and more preferably to cool the transparent part.

By providing an irradiation source, the flow reactor becomes suitable for photochemical reactions that require non-visual radiation, e.g. UV radiation.

In an embodiment of the present invention, the reactor further comprises a heat exchanger in thermal connection with said process channel.

The heat exchanger provides the capability of controlling the temperature within the process channel by heating or cooling. This is advantageous as it enables to set the temperature within the process channel depending on the process.

In a preferred embodiment of the present invention, said bottom wall and/or said mixing elements are manufactured from laboratory glass, polymers, ceramic or metal.

In a more preferred embodiment of the present invention said bottom wall is manufactured from a thermally conductive material having, in particular, a thermal conductivity of at least 5 W/mK, the bottom wall being part of said heat exchanger, preferably said mixing elements being part of said heat exchanger and being manufactured from a thermally conductive material having, in particular, a thermal conductivity of at least 5 W/mK, more preferably said bottom wall and mixing elements are integrally formed.

By using the mixing elements as a part of the heat exchanger, the surface to volume ratio (i.e. the ratio of the contact surface area between the heat exchanger and the material within the process channel to the volume of the fluid within the process channel) is increased which allows for an improved heat transfer between the fluid within the process channel and the heat exchanger.

In an embodiment of the present invention, at least one of said side walls comprises a plurality of deflector elements configured to locally deflect said flow.

The provision of deflector elements, such as baffles, avoids that a laminar flow would occur near the side walls, which laminar flow is undesirable as it leads to parts of the flow that are not sufficiently mixed and/or have a different residence time.

In an embodiment of the present invention, at least said top wall of the process channel is removably attached to the side walls and the end walls of the process channel, at least one sealing member preferably being provided between said top wall on the one hand and said side walls, said first end wall and said second end wall on the other hand.

By having a removable top wall, the internal volume of the process channel may be easily cleaned and/or parts replaced.

In an embodiment of the present invention, one or more of said top wall, said bottom wall, said side walls, said first end wall, said second end wall and said mixing elements are provided with a coating.

Such a coating may be used for a variety of reasons, such as an additional protective layer (for use in aggressive or corrosive media), catalytic properties (for catalytic solid-liquid reactions), improvement of the flow properties by changing surface tension, and/or surface area and/or surface roughness, and/or different reflection properties.

In an embodiment of the present invention, said mixing elements are formed by at least one removable inlay disposed within the process channel.

A separate inlay has the benefit that the same process channel can be used with a variety of inlays having differently shaped mixing elements and/or being manufactured from different materials and/or being conveniently coated with different coatings as described above. Moreover, inlays are a convenient way to modify the flow behaviour within the process channel. Furthermore, in case the mixing elements are damaged (e.g. due to abrasion) the inlay can be easily replaced.

In an embodiment of the present invention, said process channel is provided with at least one further inlet connected to a gas chamber, said at least one further inlet comprising a semipermeable membrane, the semipermeable membrane preferably forming the top wall of said process channel.

In this embodiment, the flow reactor is especially suited for gas-liquid reactions. Specifically, as the top wall is preferably formed by the semipermeable membrane, which corresponds to the gas inlet, the gas from the gas chamber is fed into the process channel over a large surface area which aids in controlling the dosage based on the applied pressure and the properties of the semipermeable membrane (e.g. the thickness, composition, porosity etc.). Furthermore, the pulsatile flow ensures a sufficient fluid renewal near the top wall thereby alleviating saturation effects of the fluid near the top thus increasing the gas absorption efficiency.

In this embodiment, the flow reactor is particular suited for removal of gas from the reaction medium. Therefore, the described gas chamber needs to be under reduced pressure compared to the reactor chamber.

In an embodiment of the present invention, said process channel can be fed with a multiphasic mixtures including partially miscible gases (e.g. gas-liquid or gas-liquid-solid mixtures). In this case the reactor can be tilted and thus the undissolved gas will progress upwards. This can improve gas hold-up depending on the angle of tilting. The oscillatory motion can improve the specific interfacial area by the reduction of mean bubble diameter of the gas bubbles.

It is a further object of the present invention to provide a method for producing a product stream having improved scalability.

This object is achieved according to the present invention with a method comprising: providing a flow reactor as described above; continuously introducing a feed stream into the flow reactor; generating a pulsating flow within said process channel; and removing a product stream from said flow reactor.

This object is also achieved by using a flow reactor as described above to produce a product stream.

By using the flow reactor as described above to produce the product stream, the improved scalability of the flow reactor naturally results in a production method having an improved scalability.

BRIEF DESCRIPTION OF THE DRAWINGS

The invention will be further explained by means of the following description and the appended figures.

FIG. 2 shows a top view of the process channel of the flow reactor of FIG. 1.

FIG. 3 shows a vertical cross-section along the longitudinal plane indicated with line Ill in FIG. 2 with the addition of a irradiation source.

FIG. 4 shows a detail of FIG. 3 focussing on the second end of the process channel.

FIG. 7 shows the flow pattern created by the static mixing elements within the flow reactor of FIG. 6.

FIGS. 8A to 8J show top views of different static mixing elements suitable for a flow reactor according to the present invention.

FIGS. 9A and 9B show side views of different static mixing elements suitable for a flow reactor according to the present invention.

FIG. 13 shows a vertical cross-section along the longitudinal plane of a flow reactor suitable for gas-liquid reactions according to the invention.

DESCRIPTION OF THE INVENTION

Figure 1:
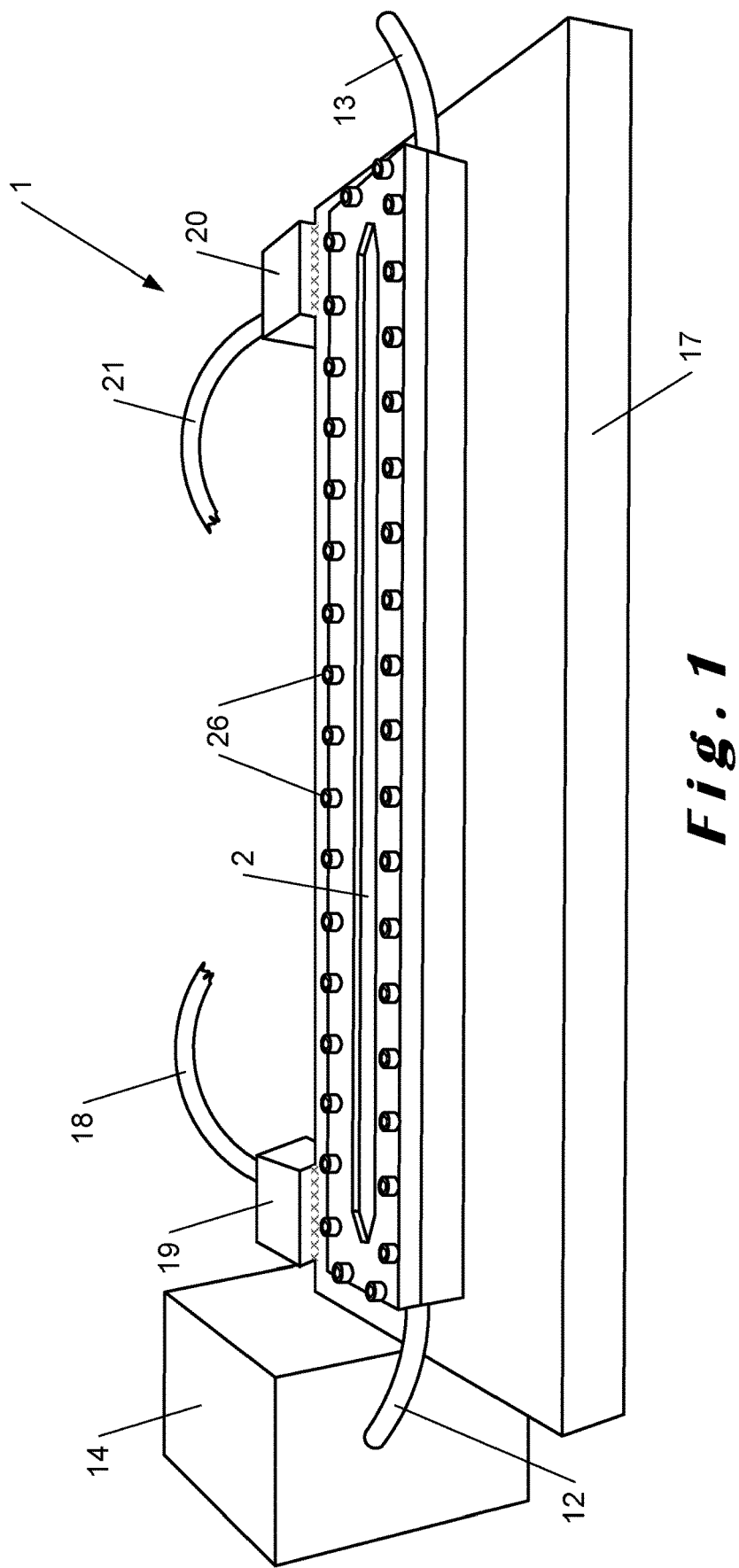
FIG. 1 shows an exemplary set-up of a flow reactor according to the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the invention may be implemented rather than as limiting the scope of the invention.

The present invention relates to a flow reactor assembly, generally indicated with reference number 1, that may be used for a wide variety of reactions and/or processes. Specifically, the reactor 1 is suitable for processing fluids or mixtures of fluids, including multiphase mixtures of fluids which may include solids or dissolved gases. These processes may involve continuous reactions, temperature adjustment, (re-)mixing, separation, extraction, crystallization or precipitation, leaching, absorption, stripping or adsorption. The processing may include a biological process, a physical process or a chemical reaction, i.e. a process that results in the interconversion of organic, inorganic or both organic and inorganic species. In particular, the reactor 1 is suitable for mixtures of reactants and/or products, suspensions, emulsions and dispersions comprising solids, liquids and (dissolved) gases.

In an embodiment, the reactor 1 is suitable for a wide variety of thermal syntheses or disintegrating (e.g. waste treatment) reactions, which may optionally be catalysed (homogeneously, heterogeneously, enzymatic). The following non-limiting list of reactions may be performed with the reactor 1: oxidation; reduction; substitution; elimination; addition rearrangements; radical reactions; ligand exchange; metal exchange; and ion exchange. More specifically, any one of the reactions of the following non-limiting list may be performed with the reactor 1: polymerization; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydro formylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; cycloadditions; radical generation; radical reaction; biradical reaction and enzymatic reactions.

Furthermore, in certain embodiments, the reactor 1 is also suitable for reactions initiated and/or maintained by non-thermal activation technologies, such as electromagnetic radiation (e.g. radio, microwave, infrared, visible light, ultraviolet, X-rays and gamma rays), potential differences using electrodes in contact with reactor matrix (i.e. electrochemistry), external electric fields, external magnetic fields, or sound waves (e.g. ultrasound). These activation technologies can applied either in isolation or in combination (e.g. photoelectrochemistry)

As illustrated in FIG. 1, the flow reactor 1 comprises a substantially straight planar process channel 2 having a longitudinal direction as indicated by arrow 3 in FIG. 2. In particular, the process channel 2 consists of a single substantially straight channel which preferably has a substantially rectangular cross-section as in the figures. The process channel 2 is delimited by a bottom wall 4 and a top wall 5 (indicated in FIG. 3), two side walls 6, 7 (indicated in FIG. 2), a first end wall 8 and a second end wall 9 (indicated in FIG. 2) which are opposite to one another. As illustrated in FIGS. 2 to 4, the process channel 2 is provided with an inlet 10 at the first end wall 8 and an outlet 11 at the second end wall 9. In use, the inlet 10 is connected to an inlet tube 12 (indicated in FIG. 1) and through which a feed stream enters the process channel 2. Similarly, the outlet 11 is, in use, connected to an outlet tube 13 through which the product stream exits the process channel 2.

As used herein, the term "feed stream" is intended to mean all components, including liquids, gases and solids, that are introduced in the process channel 2 through the inlet(s) 10 in order to perform the desired reaction and/or process.

As used herein, the term "product stream" is intended to mean all components, including liquids, gases and solids, that are discharged from the process channel 2 through the outlet(s) 11 as a result of the desired reaction and/or process.

It will be readily appreciated that, although the inlet 10 and outlet 11 are illustrated in the figures as being in the bottom wall 4 of the process channel 2, in other embodiments, the inlet 10 and/or the outlet 11 may be provided in respective ones of the first end wall 8 and/or the second end wall 9. Furthermore, it will be appreciated that one or more additional inlets and/or outlets may be provided between the first end wall 8 and the second end wall 9, for example near the middle of the process channel 2. Moreover, multiple inlet tubes 12 may be connected to a single inlet 10 in which case the feed stream is formed by mixing of the streams from the multiple inlet tubes within the flow reactor assembly 1 before reaching the inlet 10.

Figure 5:
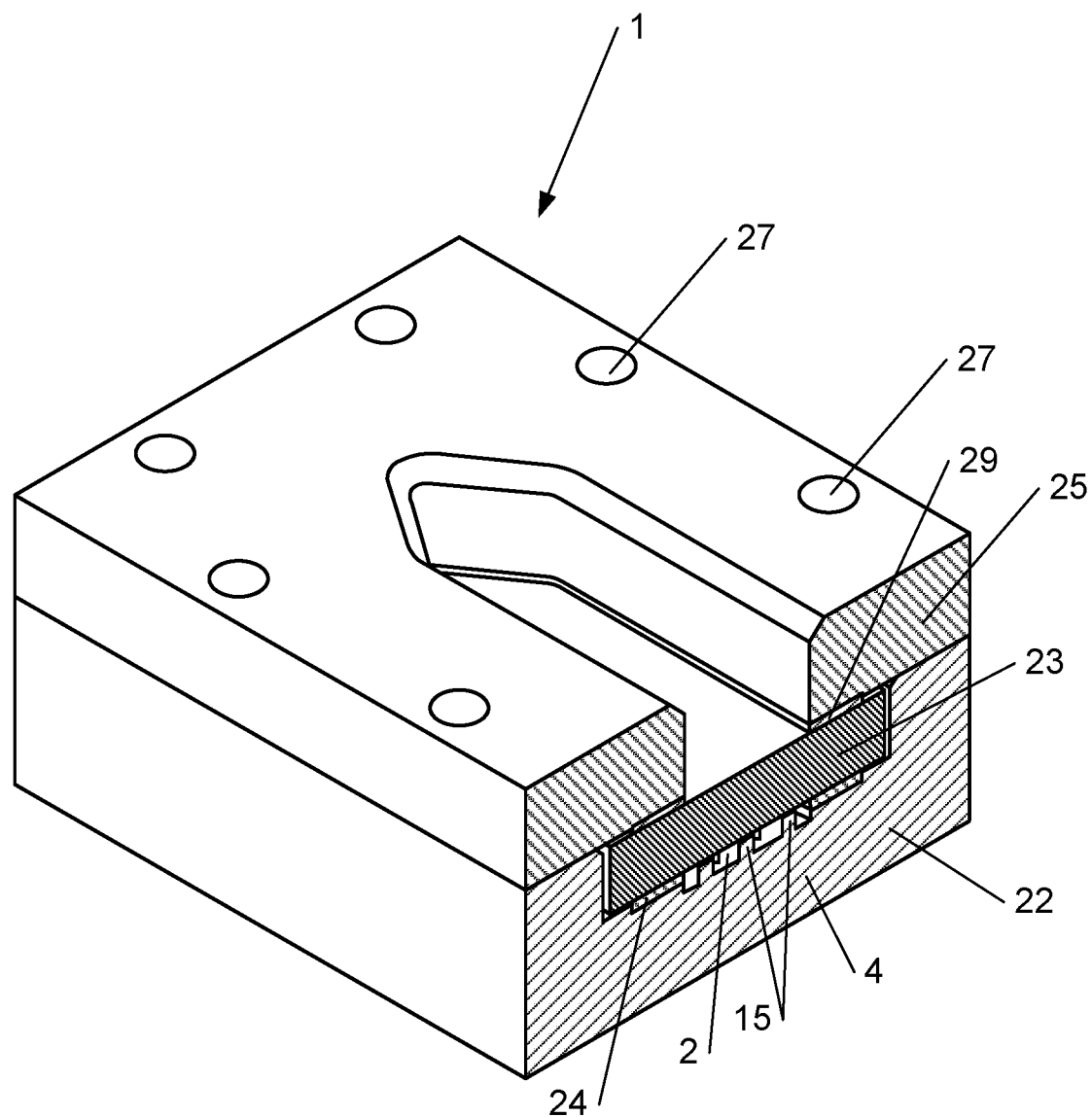
FIG. 5 shows a perspective view of a transverse cross-sectional view through the flow reactor of FIG. 1.
Figure 6:
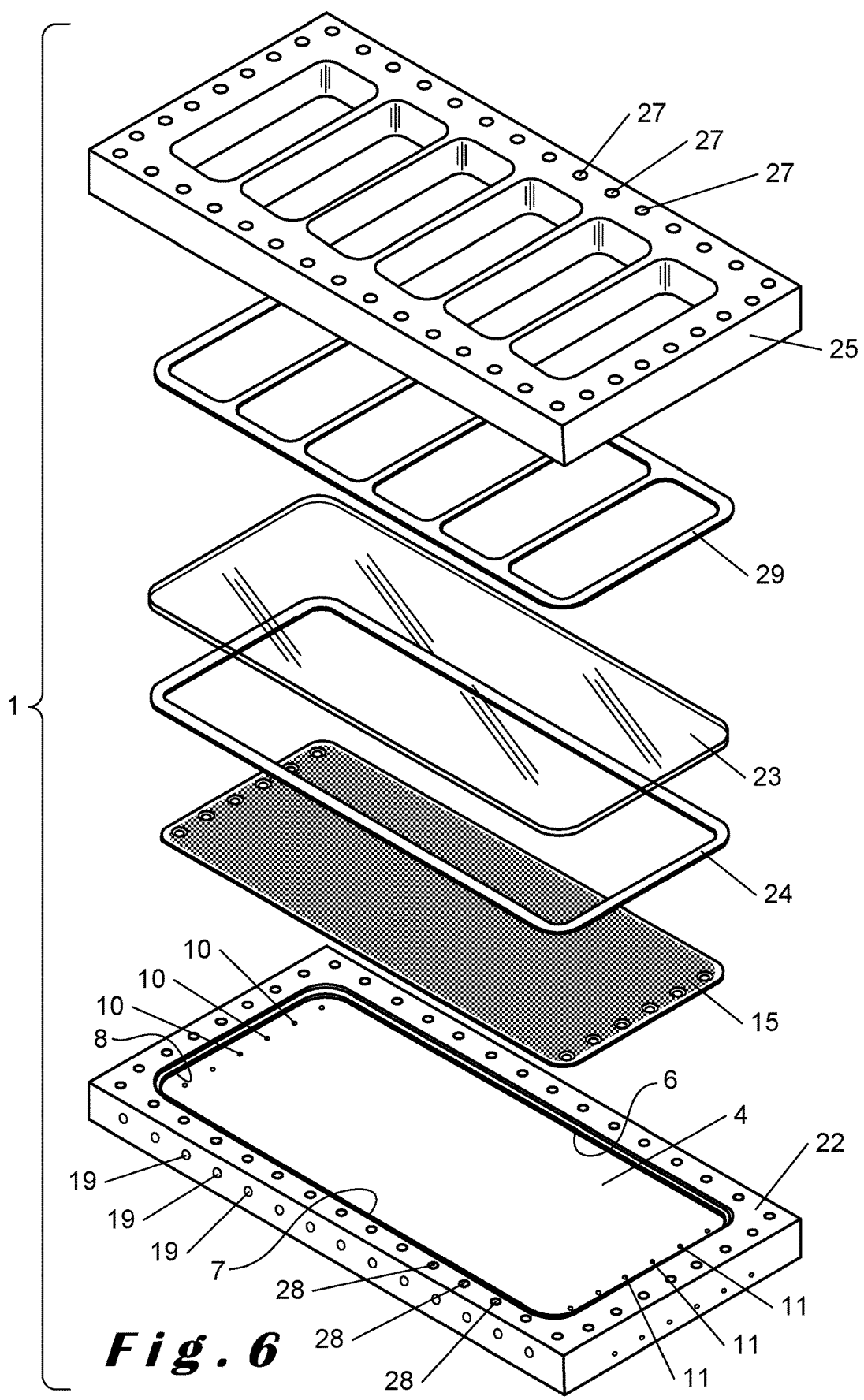
FIG. 6 shows an exploded view of another flow reactor according to the present invention.

The process channel 2 is typically assembled from a variety of different parts as illustrated in FIGS. 5 and 6. In particular a bottom half 22 is provided that also forms the bottom wall 4 of the process channel 2. The bottom half 22 is provided with the inlet(s) 10 and/or the outlet(s) 11 that open in the bottom wall 4. In FIG. 6 a sheet of static mixing elements 15 is placed in a corresponding recess in the bottom half 22. Alternatively, as in FIG. 5, the static mixing elements 15 may be integrally formed in the bottom half 22. A cover plate 23 is placed on top of the mixing elements 15, which cover plate 23 acts or may act as the top wall 5. Preferably, a seal 24 is provided between the cover plate 23 and the bottom half 22, which seal 24 ensures a proper sealing of the process channel 2 upon mechanical compression of the seal 24 between the bottom half 22 and the cover plate 23. The cover plate 23 is clamped to the bottom half 22 by an upper half 25 that, as illustrated in FIG. 1, is firmly fixed to said lower half by a plurality of bolts 26 (indicated in FIG. 1) that fit into corresponding holes 27 in the upper half 25 and at least partly threaded holes 28 in the lower half 22. Preferably, a protection layer 29 is provided between the cover plate 23 and the upper half 25, this protection layer 29 equalizes the pressure exerted by the fluid within the process channel 2 on the cover plate 23 thereby decreasing the chance that the cover plate 23 would be damaged due to an excessive local pressure. The protection layer 29 is preferably manufactured from chemically resistant materials, such as polyfluorinated polymers.

It will be readily appreciated that the bottom half 22 and top half 25 may be joined together by other means besides the bolts 26. For example, external clamps may be provided to clamps these halves 22, 25 together. Alternatively, the halves 22, 25 may be permanently joined together, although a removable top half 25 is preferred as this makes it much easier to clean the interior of the process channel 2 and/or replace parts.

Preferably, a protective sheet (not shown) may be applied on the side of the cover plate 23 that forms the top wall 5, in which case the protective sheet forms the top wall 5. Such a protective sheet is advantageous as it is suitable to protect the cover plate 23 from fouling by material deposition and/or aggressive media (e.g. strong bases and sources of fluorides) which can attack the material from which the cover plate 23 is manufactured. Furthermore, this protective sheet can be easily replaced in case it degrades during use. The protective sheet is preferably manufactured from chemically resistant materials, such as polyfluorinated polymers.

The halves 22, 25, the mixing elements 15 and the cover plate 23 may be manufactured from a whole variety of materials. However, chemically resistant materials are preferred. Such materials may include (poly)fluorinated polymers (e.g. PTFE, FKM, FPM, FFKM, FFPM, etc.), graphite, rubber, fibre and glass (e.g. borosilicate, Pyrex®, Vycor®, etc.) or other transparent materials. However, Incalay®, Monel®, Hastelloy®, Inconel®, Durimet®, Si, SiC, steel, stainless steel and any other corrosion resistant metals or alloys are preferred. Moreover, these components may be manufactured using different machining processes, such as milling, etching processes, laser medium processing, micro spark erosion, 3D printing, etc.

The process channel 2 may be designed to be operated under pressure, in which case the thickness and/or the mechanical strength of the halves 22, 25, the mixing elements 15, the cover plate 23, the seal 24, etc. is chosen for the desired pressure. A typical pressure within the process channel 2 is between 1 and 11 bar and preferably between 2 and 5 bar. However, it will be readily appreciated that a pressure below 1 bar (i.e. an underpressure) may also be used in the process channel 2.

A separate inlay for the mixing elements 15 as in FIG. 6 is advantageous over mixing elements 15 that are integrally formed with the bottom half 22 as in FIG. 5. Specifically, a separate inlay has the benefit that the same process channel 2 can be used with a variety of inlays having differently shaped mixing elements 15 and/or being manufactured from different materials. Moreover, in larger versions of the process channel 2, the handling of the flow reactor assembly 1 can become impractical because of the weight thereof, and inlays are a convenient way to switch process channels 2 using the same base 22 and lid 25. In other words, a different process channel 2 may be achieved using the same base 22 and lid 25 by only replacing the inlay. Furthermore, in case the mixing elements 15 are damaged (e.g. due to abrasion or corrosion) the inlay can be easily replaced. Moreover, it will be readily appreciated that the inlay may be composed of different sections. In other words, different inlays may be placed adjacent to one another along the length of the process channel 2.

The interior of the process channel 2 may optionally be coated to add additional functionalities. The coating can serve as an extra protective layer (e.g. when aggressive and/or corrosive media are used), have catalytic properties (e.g. for catalytic and photocatalytic solid-liquid reactions), modify the flow properties by changing surface tension and/or surface roughness, or change reflection properties.

A protective coating advantageously comprises materials such as a functionalized mixture of amorphous silicon, oxygen and carbon (e.g. Dursan®), tantalum, PTFE, ceramics, glass, etc.

One type of photocatalytic coating comprises a metal chalcogenide, such as a metal oxide (for example $TiO_2$, $ZnO$ or $SrTiOs$, $CdS$, $CdSe$, $Fe_2O_3$, $Cu_2O$, $Fe_2TiO_3$, $Bi_2O_3$, etc.) or a polymer (e.g. poly(methyl)methacrylate) which can serve as anchor point to covalently bind photocatalysts, acids, bases, ligands (with or without metals), organic ions (tetraalkylammonium, sulfonates, zwitterions etc.), organocatalysts or enzymes or has photoredox properties (Graphene, (doped) graphitic nitride, etc.). Another type of catalytic coating may comprise and/or may be bounded with an enzyme, a peptide, a peptidomimetic or other biocatalytic based species.

The surface layer of a catalytic coating may be porous or fibrous which can be inert (e.g. microfibrous glass) or catalytic (e.g microfibrous copper) in which other catalytic species can be entrapped. In other words, the surface of the coating has a microstructure which includes a number of pores, depressions and holes therein. This porosity serves to increase the surface area available to make contact with the fluid in the process channel 2.

Furthermore, the nature of the coating may influence the adsorption of specific molecules and/or materials in the fluid carried through the process channel 2, which further modify the activity of the flow reactor 1.

The coating can be applied by a variety of methods, such as sol-gel methods, dipping, sputtering, anodic oxidation, electrodeposition, immobilized nanoparticles, chemical vapor deposition (CVD), Physical Vapor Deposition (PVD), anodic oxidation under spark discharge (ANOF), etc.

As illustrated in FIG. 1, the inlet tube 12 is connected to a flow generator 14 configured to generate a pulsatile flow within said process channel, the pulsatile flow comprising a unidirectional net flow component through said process channel along said longitudinal direction and an oscillatory flow component superposed on said net flow component.

As used herein, the term "pulsatile flow" is intended to mean the resultant periodic flow of the superposition of a unidirectional net flow along said process channel and a periodic oscillatory flow, irrespective of the amplitude of the oscillatory flow. In particular, the maximum oscillatory velocity may be less than the net flow velocity, meaning that the flow always has a positive velocity. Alternatively, the maximum oscillatory velocity may be more than the net flow velocity, meaning that the flow at times has a negative velocity. Preferably, said net flow has a substantially constant flow rate.

Moreover, the process channel 2 is further provided with a plurality of static mixing elements 15 configured to locally split and recombine said flow as illustrated in FIG. 7. More specifically, the incoming flow (indicated with arrows 16) approaches one of the mixing elements 15 and is split into two different streams (indicated with arrows 16L for the left-hand component and 16R for the right-hand component). After having passed a mixing element 15, the left-hand component 16L then mixes with the right-hand component 16R from an adjacent mixing element 15.

It has been found that combining a process channel 2 having static mixing elements 15 disposed therein, preferably being distributed along the entire length and width of the process channel 2, with the pulsatile flow generated by the flow generator 14 leads to the generation of sufficient turbulence and/or mixing of the fluid within the process channel 2 even at low net flow rates. In particular, in the absence of an oscillating flow component, the mixing elements 15 do not hinder the development of a laminar flow behaviour for a low net flow rate where the split flow 16R, 16L does not mix as intensely with left-handed, respectively right-handed flow components from adjacent mixing elements 15, meaning that there is not sufficient turbulence and/or mixing of the fluid within the process channel 2. However, the oscillating flow component alleviates this issue as the oscillating behaviour locally creates sufficiently high flow rates such that the flow is impinged on the mixing elements 15 with a high enough velocity such that the split flow components 16R, 16L indeed mix with left-handed, respectively right-handed flow components from adjacent mixing elements 15.

It will be readily appreciated that the pulsatile flow may be damped in the product stream, i.e. the oscillatory component is damped in order to obtain a net flow in the outlet tube 13. Having only a net flow outside the flow reactor assembly 1 is preferred especially in case one or more measuring and/or monitoring appliances are connected. Such a damping may be achieved in different ways, e.g. by using a hydraulic accumulator, a cyclone, a buffer, etc.

In some embodiments the flow generator 14 may generate the unidirectional flow by any different number of means which are known to the person skilled in the art, such as natural convection, forced convection, gravity, pressurized feed vessels, mass flow controlled (liquefied) gases, slurry dosage, etc. In particular, in the case of forced convection, pumps (e.g. a peristaltic pump, a gear pump, a diaphragm pump, a piston pump, a centrifugal pump, a syringe pump, etc.) may be used. Moreover, in the case of net flow due to gravity, it will be readily appreciated that the orientation of the process channel 2 is different from the horizontal orientation illustrated in the figures. In other words, the reactor 1 may be set up in different orientations, including tilted and/or vertical orientations, depending on the specific circumstances.

In some embodiments the flow generator 14 may include an oscillator (not shown) configured to generate the oscillating flow component. In particular, said oscillator may be configured to generate said oscillatory flow component with an oscillation frequency of at least 0.01 Hz, preferably at least 0.1 Hz and more preferably at least 0.5 Hz and of at most 400 Hz, preferably at most 100 Hz, more preferably at most 50 Hz and most preferably at most 25 Hz, and with an oscillation centre-to-peak amplitude of at least 1 µm, preferably at least 10 µm, more preferably at least 0.1 mm and most preferably at least 0.5 mm and at most 100 cm, preferably at most 20 cm, more preferably at most 5 cm, most preferably at most 1 cm, advantageously at most 5 mm and more advantageously at most 2 mm.

Moreover, it is advantageous when the generated centre-to-peak amplitude of the oscillatory flow is of at least the same order of magnitude as the distance between subsequent mixing elements 15, i.e. mixing elements which are adjacent to one another along the longitudinal direction 3. In other words, the centre-to-peak amplitude is ideally at least half of the distance between subsequent mixing elements as this ensures that, for each periodic oscillation cycle, a fluid parcel is displaced over a distance in the longitudinal direction that it is at least equal to the distance between subsequent mixing elements, meaning that, for each periodic oscillation cycle, the fluid parcel normally is split by a mixing element 15.

The oscillator may be in the form of a modified membrane pump or a piston pump where the check valves have been removed or altered. Alternatively, a custom made piston or bellows directly connected to the process volume, e.g. the feed stream, is possible too. Furthermore, a first pump, e.g. a membrane pump, may be used to generate the net flow component and a second pump, e.g. a modified membrane pump, may be used to generate the oscillatory flow component.

It will be readily appreciated that, in practice, the flow generator 14 may have different settings, meaning that the flow generator 14 may be capable of generating net flows across a range of flow velocities and/or oscillatory flows across a range of oscillation amplitudes and/or oscillation frequencies.

In general, for a pulsatile flow, the net and oscillatory Reynolds numbers are defined in order to characterise the flow. The net Reynolds number is given by $R_n$=uL/v, where u is the velocity of the net flow component, L is a characteristic length which is typically taken as the hydraulic diameter of the process channel 2 and v is the kinematic viscosity of the fluid. The oscillatory Reynolds number is given by $R_o$=2πfx$_0$L/v, where f is the frequency of the oscillatory flow component and $x_0$ is the centre-to-peak amplitude of the oscillatory flow component. Using both Reynolds numbers it is also possible to define the velocity ratio $$\Psi = \frac{R_o}{R_n} = 2\pi f x_0 / u.$$

Furthermore, as both Reynolds numbers are dependent on the characteristics of the medium within the process channel 2 through the kinematic viscosity, it is useful to define normalised Reynolds numbers. Specifically, the normalised net Reynolds number is given by $\widetilde{R_n}$=$R_n$v=uL, and the normalised oscillatory Reynolds number is given by $\widetilde{R_o}$=$R_o$v=f·2π·$x_0$L.

It has been found that a normalised oscillatory Reynolds number that is at least 5v, preferably at least 25v, more preferably at least 50v, advantageously at least 75v and most advantageously at least 100v leads to sufficient turbulence and/or chaotic motions even for relatively low net flow rates as described above. In some embodiments, said pulsatile flow has a velocity ratio of at least 1, preferably at least 5, more preferably at least 10, advantageously at least 15 and most advantageously preferably at least 20. Similarly, said pulsatile flow has a normalised net Reynolds number that is preferably at most 200v, preferably at most 100v, more preferably at most 50v, most preferably at most 20v, advantageously at most 10v, more advantageously at most 5v, and most advantageously at most 0.5v. Such low net Reynolds numbers are advantageous as it enables a long residence time of the fluid within a short process channel 2, meaning the flow reactor 1 may be very compact and may thus be easily used in a laboratory for example.

In calculating the Reynolds numbers, the hydraulic diameter of the process channel 2 is used. This hydraulic diameter is typically dependent on the cross-sectional area of the process channel, i.e. its height H and its width W, and on the area that is filled by the mixing elements 15

As used herein, the term "height of the process channel" is intended to mean the average distance between the bottom wall 4 and the top wall 5 of the process channel 2.

As used herein, the term "length of the process channel" is intended to mean the average distance between the first end wall 8 and the second end wall 9 of the process channel 2.

As used herein, the term "width of the process channel" is intended to mean the average distance between the side walls 6, 7 of the process channel 2.

In an example of the flow reactor, the planar process channel 2 has a cross-section with a high aspect ratio (e.g. at least 3, in particular at least 5 and more in particular at least 10), where the aspect ratio is the ratio of the width to the height of the process channel.

In certain embodiments, the height H of the process channel 2 is at least 0.1 mm, preferably at least 0.5 mm, more preferably at least 1 mm and most preferably at least 2 mm, said height H being at most 10 mm, preferably at most 7.5 mm, more preferably at most 5 mm and most preferably at most 3 mm. Such a limited height H is especially advantageous for photochemistry as described below as the radiation is then able to penetrate to the bottom wall 4 thus irradiating sufficiently all of the fluid within the process channel 2.

In certain embodiments, the length L of the process channel 2 is at least 1 cm, preferably at least 5 cm, more preferably at least 10 cm, advantageously at least 25 cm and most advantageously at least 50 cm, said length being at most 10 m, preferably at most 5 m, more preferably at most 2 m and most preferably at most 1 m. Such a range of lengths ensures that both long residence times and short residence times are feasible depending on the reaction and/or process in combination with low net flow rates which are known to have a lower pressure drop along the length of the process channel 2.

Moreover, the width W of the process channel 2 is typically decided based on the desired production capacity, i.e. the wider the process channel 2, the larger the internal volume thereof and the larger the volume of the product stream. In other words, the width W of the process channel 2 may cover several orders of magnitude in size range. For example, in some embodiments, the width W may be at least 5 mm, preferably at least 1 cm and more preferably at least 2 cm and at most 10 m, preferably at most 1 m, more preferably at most 50 cm and most preferably at most 10 cm.

It will be appreciated that when the width W of the process channel 2 is increased, increasing the number of inlets 10 and outlets 11 is also recommended as illustrated in the flow reactor assembly 1 shown in FIG. 6. Such an increase in the number of inlets 10 and outlets 11 is advantageous as there could otherwise (i.e. when providing a wide process channel 2 with a single inlet 10 and a single outlet 11 that are located centrally on respective ones of the first end wall 8 and second end wall 9) occur dead volumes near the corners of the process channel 2 which naturally decrease the performance of the flow reactor 1 and, in particular, result in an residence time distribution (RTD) having a long tail with a premature breakthrough, which is undesired.

In some embodiments, the distance between adjacent inlets 10 and/or outlets 11 is at most 10 cm, preferably at most 5 cm and more preferably at most 2 cm. Such a small distance aids in avoiding dead volumes between the inlets 10 and outlets 11.

In some embodiments, the mixing elements 15 are provided in the process channel 2 in a density of at least 0.1 mixing element per $cm^2$, more preferably with at least 1 mixing element per $cm^2$ and most preferably with at least 5 mixing elements per $cm^2$ and with a density of at most 100 mixing elements per $cm^2$, more preferably with at most 50 mixing elements per $cm^2$ and most preferably with at most 10 mixing elements per $cm^2$. Moreover, the process channel 2 has an internal volume, i.e. a volume without any mixing elements 15 being disposed within the process channel 2. In some embodiments, the mixing elements 15 fill up at least 5% of said internal volume, preferably at least 10% of said internal volume and more preferably at least 15% of said internal volume and at most 60% of said internal volume, preferably at most 50% of said internal volume, more preferably at most 40% of said internal volume, most preferably at most 30% of said internal volume and advantageously at most 20% of said internal volume.

It has experimentally been found that such a distribution of mixing elements 15 within the process channel 2 enables to provide a desired mixing level for a whole range of Reynolds numbers for different reactions and/or processes.

Furthermore, it is advantageous, especially at very low net Reynolds numbers, i.e. very low net flow rates, to provide smaller openings between adjacent mixing elements 15. As such, it has been found that it is beneficial when the mixing elements 15 are separated by a shortest distance from an adjacent mixing element 15 of at least 0.1 mm, preferably at least 0.5 mm, more preferably at least 1 mm and most preferably at least 1.5 mm, said shortest distance being preferably less than 8 mm, more preferably less than 5 mm, advantageously less than 3 mm and more advantageously less than 2.5 mm.

It will be readily appreciated that the mixing elements 15 may exist in various shapes and/or sizes. A number of examples of differently shaped mixing elements 15 are shown in FIGS. 8A to 8J. In particular, the mixing elements 15 may be rectangular-, polygonal-, diamond-, oval-, eye-, elliptical- or cylindrical-shaped. It will be readily appreciated that each shape may be placed in various orientations within the process channel 2. Moreover, differently shaped mixing elements 15 may be used within the same process channel 2. Moreover, the mixing elements 15 may also be perforated and/or hollow.

Furthermore, although the mixing elements 15 may have surfaces that are perpendicular with respect to the bottom wall 4, these surfaces may also be inclined with respect to the bottom wall 4 as in FIGS. 7, 9A and 9B. In other words, the mixing elements 15 may have a cross-sectional area which varies with height. Such a variation is also advantageous as it typically leads to an improved upward mixing within the flow as illustrated in FIGS. 9A and 9B. Such vertical vortices, i.e. vortices having at least a vertical flow component, may be beneficial when working with suspensions (catalyst, reagent) or to drag precipitations from the process channel 2 as the settling of solids on the bottom wall 2 by gravity is minimized or to transport solids through the process channel 2. The generation of vertical vortices is especially beneficial in photochemistry which is known to suffer from substantial differences in irradiation at the top of the process channel 2 when compared to the bottom thereof. The vertical mixing alleviates the consequences from the irradiation difference as the fluid within the process channel 2 is also mixed top to bottom and vice versa. In other words, the films near the top wall 5 and the bottom wall 4 are refreshed more often. These vortices also aid in heat transfer since the relatively hot top fluid layers are also advected to the bottom wall 4 which may form part of a heat exchanger as described below.

Preferably, the mixing elements 15 are set up in a periodic pattern, i.e. a repeating pattern along the longitudinal direction 3 of the process channel. Furthermore, it is advantageous when the mixing elements 15 are set up in a symmetrically ordered periodic pattern, meaning that the mixing elements 15 are mirrored with respect to the vertical longitudinal centre plane of the process channel 2. Such patterns typically result in repeating flow patterns which improve the RTD.

As illustrated in FIG. 2, the side walls 6, 7 of the process channel 2 may be provided with deflectors 16 configured to locally deflect said flow. In this way, the development of a laminar flow at the side walls 6, 7 is largely avoided as the locally deflected flow will mix with the locally split flow due to adjacent mixing elements 15. In the illustrated embodiments, the side walls 6, 7 have a periodically recurring constriction, but it will be appreciated that the deflectors 16 need not be periodic, nor need to locally constrict the width W of the process channel 2.

In the embodiment illustrated in FIG. 1, the flow reactor 1 is also provided with a heat exchanger 17 in direct contact with the process channel 2. The heat exchanger 17 is used to control and maintain the temperature within the process channel 2 by either adding heat to the process channel 2 or by removing heat from the process channel 2. The heat exchanger 17 may operate on different principles, for example via the circulation of thermal fluids.

As illustrated in FIG. 1, the heat exchanger 17 comprises a rectangular plate that is in direct contact with the bottom wall 4 of the process channel 2, i.e. the plate forms a thermally controlled support element on which said process channel 2 is mounted. The plate may be manufactured from a plurality of materials, as long as they have a sufficiently high thermal conductivity to ensure that sufficient heat is supplied to or removed from the process channel 2 via the bottom wall 4. In particular, the plate may be manufactured from materials including metals or metal alloys (such as steel, stainless steel, nickel alloys, titanium, Monel®, Hastelloy®, Inconel®, Incalay®, Durimet®, copper, Tantalum, aluminium, palladium, platinum, gold, rhodium, iridium, etc.), ceramics (such as silicon, silicon carbide, $Al_2O_3$, etc.), polymers (e.g. PTFE, PVDF, etc.), glass, etc. The following are examples of the desired thermal conductivity λ for different materials that may be used to manufacture the plate: aluminium with A about 200 W/mK, copper with λ=400 W/mK, bronze with λ about 100 W/mK, carbon steel with λ about 50 W/mK, silver with λ about 430 W/mK, zinc with λ about 100 W/mK, silicon with λ about 200 W/mK, or SiC with λ about 300 to 500 W/mK. In general, it is preferred that the thermal conductivity λ is at least 25 W/mk, more preferably at least 75 W/mk, most preferably at least 150 W/mk and advantageously at least 200 W/mk.

In particular, in cooling mode, a cooled fluid is pumped into the heat exchanger 17 via a tube 18 to inlet 19 which opens onto one or more channels (not shown) within the metal plate 17. Due to the thermal contact between the channels within the metal plate 17 and the process channel 2, the cooled fluid is heated while the process channel 2 is cooled. The heated fluid then exits the metal plate 17 via outlet 20 into tube 21. Tube 21 is then typically connected to a further heat exchanger (not shown) which cools the heated fluid and injects the cooled fluid again into tube 18. In heating mode the same principle applies but the fluid entering the inlet 19 is now hotter than the fluid within the process channel 2. It will be readily appreciated that the roles of the inlet 19 and outlet 20 may also be reversed. In other words, cooled or heated fluid may be inserted through outlet 20 to create a counter-current heat exchanger.

As the heat needs to be supplied to or removed from the process channel 2, it is advantageous when the bottom wall 4, formed by the lower half 22 of the flow reactor 1 (see FIG. 5), is manufactured from materials having a sufficiently high thermal conductivity. In particular, the bottom half 22 may be manufactured from materials including metals or metal alloys (such as steel, stainless steel, nickel alloys, titanium, Monel®, Hastelloy®, Inconel®, Incalay®, Durimet®, copper, Tantalum, aluminium, palladium, platinum, gold, rhodium, iridium, etc.), ceramics (such as silicon, silicon carbide, di-aluminium-tri-oxide, etc.), polymers (e.g. PTFE, PVDF, etc.), glass, etc.

Furthermore, it is also advantageous when the static mixing elements 15 form a part of the heat exchanger 17 as this dramatically increases the contact surface area between the fluid within the process channel 2 and the heat exchanger 17. In the embodiment illustrated in FIGS. 1 to 5 this is achieved by having the mixing elements 15 integrally formed with the bottom wall 4, i.e. with the lower half 22 of the flow reactor 1.

It will be appreciated that other types of heat exchangers 17 may be used, such as heat exchangers operating on electrical heating or Peltier elements. Moreover, other heat exchangers are known to the person skilled in the art and may readily be applied in combination with the flow reactor assembly 1 of the present invention.

Moreover, it will be appreciated that the heat exchanger 17 may be integrated within the lower half 22 of the flow reactor 1, which lower half 22 also comprises the bottom wall 4, as illustrated in FIG. 6 where a plurality of inlets 19 are provided to introduce cooled or heated fluid. The outlets 20 are not shown in FIG. 6 as they are located on the opposite side of the bottom half 22. Such a configuration is preferred as there is then no need to have the additional thermally controlled support element. Furthermore, it will be readily appreciated that, contrary to the embodiment illustrated in FIG. 6, the mixing elements 15 may also be integrally formed with the lower half 22 of the flow reactor 1 to increase the heat transfer area and/or rate.

The operating temperature of the process channel 2 is typically dependent on the reaction and/or process for which the flow reactor 1 is being used. In some embodiments, the operating temperature is at least −100° c., preferably at least −30° C. and more preferably at least −20° C. and at most 400° C., preferably at most 200° C. and more preferably at most 100° C.

In some embodiments, the flow reactor 1 may be provided by an at least partly transparent top wall 5 in the appended figures. In other words, one or more parts of the cover plate 23 are transparent. In this way the flow reactor 1 may be used for photochemistry, i.e. reactions requiring irradiation as a trigger, such as photo initiated polymerizations.

Furthermore, the flow reactor 1 can be used in combination with an irradiation source 32 (shown in FIG. 3) for a selection of photochemical reactions when the cover plate 23 is at least partially transparent to wavelengths of interest for photochemistry in the UV and visible spectra. The irradiation source 32 may comprise light-emitting diodes, excimer lamps, metal vapour lamps, gas discharge lamps, lasers, OLEDS, fluorescent lamps, sunlight, etc.

As used herein, the term "irradiation" is intended to mean electromagnetic emission with a wavelength suitable for photochemistry. Typically, the electromagnetic emission has a wavelength between 100 nm and 1 m.

In case of photochemistry, it is advantageous when the top part of the internal process channel 2 is unobstructed, i.e. when the mixing elements 15 do not extend entirely to the top wall 5. In this way, the mixing elements 15 results in a decreased shade, meaning that the irradiated volume is increased. Furthermore, the generation of vertical vortices due to mixing elements 15 as shown in FIG. 9, i.e. having a non-constant cross-section in the vertical direction, is advantageous as this leads to a constant refreshing of the layers close to the irradiation source 32. Such an unobstructed top part of the internal process channel 2 may be achieved by using mixing elements 15 having a height that is at most equal to said process channel height, preferably 99.5% of the process channel height H, more preferably at most 95% of the process channel height H and most preferably at most 90% of the process channel height H. Furthermore, having mixing elements 15 that are slightly less high than the process channel height H also avoids direct contact between the mixing elements 15 and the top wall 5.

In some embodiments, at least one cooling means (not shown) is provided configured to cool the irradiation source 32 and/or the region between the irradiation source 32 and the cover plate 23, and the cover plate 23 itself. In this way the irradiation source 32 may be operated at its desired operating temperature increasing its efficiency. Moreover, cooling the region between the irradiation source 32 and the cover plate 23, or the cover plate itself, aids in controlling the temperature within the process channel 2.

An additional benefit of the transparent cover plate 23 is that the radiation from the irradiation source 23 does not need to penetrate through thermal oil layers, as is the case in some known flow reactors, which causes loss of efficiency especially during long irradiation times and/or limits the available wavelengths that may be used.

A spectral filter (not shown) can be placed on top of the transparent cover plate 23, e.g. in the form of a sheet. The spectral filter may be a short-pass, long-pass, band-pass or interference filter in order to select the appropriate wavelengths depending on the reaction and/or process for which the flow reactor 1 is being used. Furthermore, an infrared filter can be applied in order to minimise undesired heating of the fluid within the process channel 2 by infrared portions of the irradiation source 32. Moreover, the spectral filter may also be a hot mirror or a cold mirror.

Moreover, to broaden the spectrum of possible wavelengths (especially in the ultraviolet region), the material of the transparent cover plate 23 may be, quartz, fused silica, $Al_2O_3$(Sapphire), Alon, $BaF_2$, BK7 glass, $CaF_2$, Germanium, KRS5, LiF, $MgF_2$, Silica glass, ZnS (FLIR), ZnSe, Aluminium oxynitride (AlON), $MgAl_2O_4$ (Spinel), polymeric materials (polymethylmethacrylate, polystyrene, cyclic olefin copolymers (COC, Topas), polydimethylsiloxane, polycarbonate, light absorbing/emitting materials, luminescent (solar) concentrators, etc.

A known problem in flow reactors for photochemistry is a decreasing transparency of a polymeric material over time, since this process is uncontrollable and decreases the performance of a flow reactor. However, due to the simple design of the flow reactor 1, this problem may be alleviated as the various transparent cover plate 23 and/or the protective sheet applied thereto may be easily cleaned and/or replaced.

Photochemical reactions can be initiated by direct activation through irradiation or via use of a photomediator (i.e. a photoinitiator, a photocatalyst or a photosensitizer). The photomediator can be present homogeneously in the feed stream, as a solid particle in the feed stream or as part of an internal coating of the process channel 2. In case of a photochemical gas-liquid reaction (e.g. generation of a singlet oxygen), the photosensitizer may also be present in a semi-permeable membrane 36 as described below with respect to FIG. 13.

Moreover, as described above, the internal coating may also increase reflection of the irradiation thus increasing the performance of the flow reactor 1 as the reflecting light from the bottom wall 4 leads to a more efficient use of the photons.

A non-limiting list of photochemical reactions includes photoisomerizations, photorearrangements, photoreductions (e.g. of $CO_2$, photooxidation (e.g. photo fenton reaction), cyclizations, [2+2] cycloadditions (e.g. Paterno-Buchi), [4+2] cycloadditions, [4+4] cycloadditions, 1,3-dipolar cycloadditions, sigmatropic shifts, photocleavage of protecting groups or linkers, photohalogenations (photofluorination, photochlorinations, photobrominations, photoiodination), photosulfochlorinations, photosulfoxidations, photopolymerizations, photonitrosations, photodecarboxylations, photosynthesis of previtamin D, decomposition of azo-compounds, Norrish type reactions, Barton type reactions, photoredox reactions, Photogeneration of active species (e.g. singlet oxygen), photo (homo) dimerization of alkynes, photoaddtions (e.g. thiol-ene coupling) phototri (or di)fluoromethylation, perfluoroalkylations, photoalkylation, photohydroxymethylation, photoacylation, photodeuteration and tritiation, dehydrogenative photooxidation, photo beta-oxidation of amines, photo beta functionalisation of carbonyl compounds, photo alpha functionalisation of amines, photo alpha functionalisation of aldehydes, acylation of ethers, carbon addition on double bonds, synergistic photocatalysis (with metals, organocatalyst and enzymes), photo cross-coupling reaction (carbon or heteroatom) (sp3-sp3, sp3-sp2, sp2-sp2), photo cascade reaction, photo aza-Henry reaction, photodehalogenations, photo halogen exchange reactions, and ATRA (atom transfer radical additions).

It will be readily appreciated that one or more sensors and/or analytic tools may be integrated within the process channel 2, within one or more walls 4, 5, 6, 7, 8, 9 thereof, in or near the inlet(s) 10 and/or outlet(s) 11 to provide readings on a host of process parameters, such as pressure, temperature, viscosity, flow rate, etc.

Additionally, monitoring tools may be able to operate through the transparent cover plate 23 (e.g. Raman, IR, NIR, UV-VIS, etc.). Using fused silica or quartz to manufacture the cover plate 23 has the advantage (over the use of common laboratory glass, e.g. borosilicate, Pyrex®, Vycor®) that these materials are translucent in the required wavelength regions. This enables spectroscopic analysis during operation of the flow reactor 1.

Besides for multiphasic reactions and/or processes involving combinations of (immiscible) liquids and solids, the flow reactor 1 can also be used for multiphasic reactions involving (dissolved) gases. The existence of separate gas phases in the reaction fluid is not recommended as the gas bubbles attenuate the superposed oscillating flow component due to their compressibility. However, when pre-saturating the feed stream under a positive pressure this attenuation may be largely avoided.

FIG. 13 illustrates a modification of the basic flow reactor assembly 1 in order to efficiently run gas-liquid reactions. Specifically, a pressurised gas chamber 33 is provided beneath the cover plate 23, which gas chamber 33 is provided with a gas inlet 34 and a gas outlet 35. The gas chamber 33 is separated from the fluid within the process channel 2 by a gas-permeable membrane 36 which forms the top wall 5 of the process channel 2 and which acts as a gas inlet into the process channel 2. This setup alleviates the need for pre-saturation and allows operation with sufficient and controlled supply of gases. Moreover, the reaction matrix has no gas concentration gradient along the process channel 2. In some embodiments, the gas-permeable membrane 36 is inert and may comprise polyfluorinated materials.

The supply of the gases will be dependent of the overpressure, the nature of the semipermeable membrane 36 and its pore size. Typical gases are oxygen, carbon dioxide, carbon monoxide, hydrogen, nitrogen oxides, trifluoromethyliodide, etc.

Also degassing of the reaction medium within the process channel 2 is feasible using an additional raster or a more rigid membrane 36 and applying a reduced pressure. In this way, undesirable gases can be removed from reaction medium (e.g. oxygen) in a pre-processing step or the equilibrium can be shifted in processes in which removal from gases (decarboxylation, nitrogen, ethene, . . . ) are involved. Alternatively, an overpressure of an inert gas may be used to remove other gases from the solution.

Figure 10:
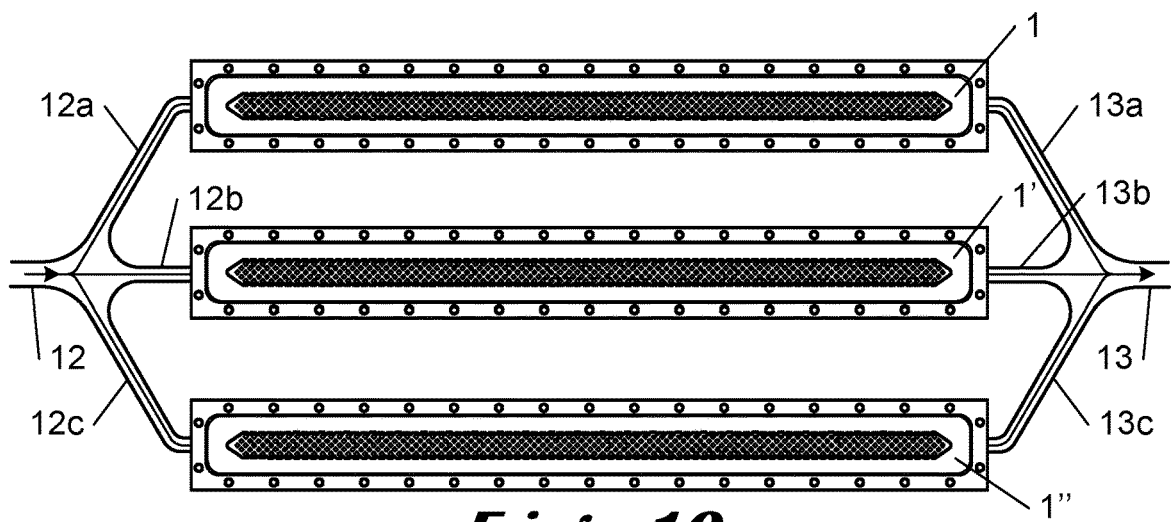
FIG. 10 shows a first parallel setup of flow reactors according to the present invention.
Figure 11:
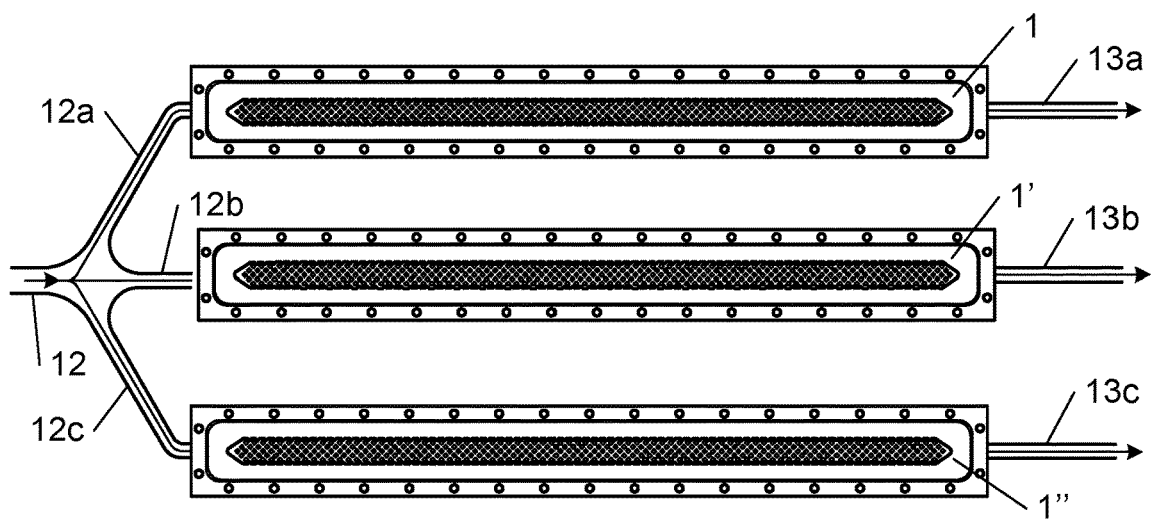
FIG. 11 shows a second parallel setup of flow reactors according to the present invention.
Figure 12:
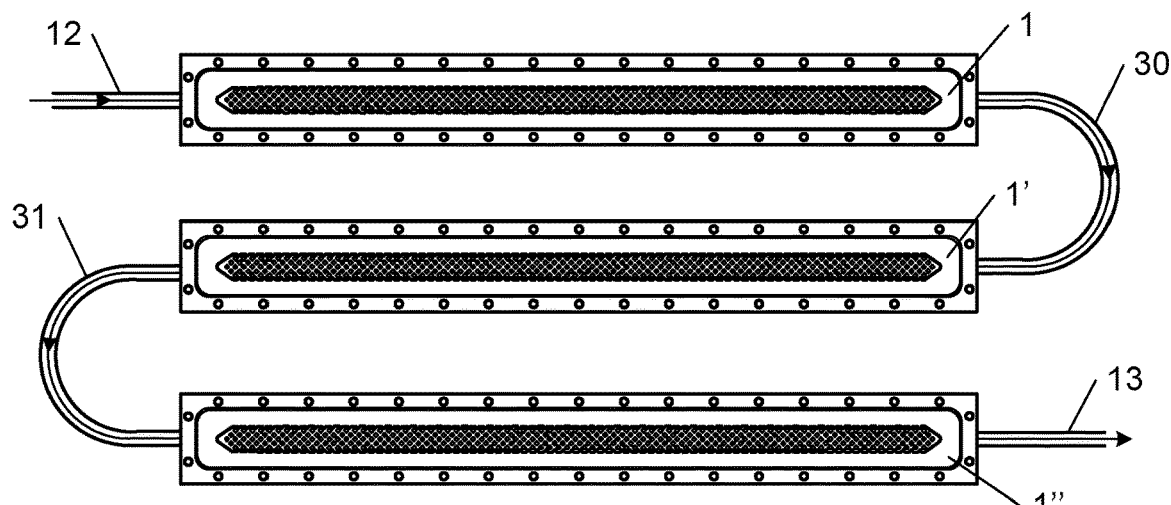
FIG. 12 shows a serial setup of flow reactors according to the present invention.

As illustrated in FIGS. 10 to 12, the flow reactor of the present invention may be used in different set-ups to achieve different aims.

As a first example, FIG. 10 illustrates a parallel set-up of three flow reactors 1, 1', 1" each having their respective inlet tube 12a, 12b, 12c that split from a single inlet tube 12 and their respective outlet tube 13a, 13b, 13c that combine into a single outlet tube 13. This parallel set-up is suitable to multiply the production capacity in cases where the width of the process channel 2 can no longer be increased, for example when the available space for the flow reactor 1 would be exceeded.

A second example is shown in FIG. 11 where three flow reactors 1, 1', 1" each have their respective inlet tube 12a, 12b, 12c that split from a single inlet tube 12 and their respective outlet tube 13a, 13b, 13c that remain separated. Such a set-up may be used for different reactions in the flow reactors 1, 1', 1", which different reactions require the same feed stream. Alternatively, the same processes may be run in the flow reactors 1, 1', 1" and the product streams kept separate for comparison purposes. Moreover, the same processes may be run in the flow reactors 1, 1', 1" at slightly different parameters (e.g. different mixing elements, different temperatures, different catalytic inlays etc.) while using the product streams to ascertain the optimal parameters.

FIG. 12 illustrates a serial set-up of three flow reactors 1, 1', 1" having an inlet tube 12 with an outlet tube 13, the flow reactors 1, 1', 1" being connected by connection tubes 30, 31. Such a set-up may be used for a variety of reasons. For example, the desired process may still be in development in which case it may be unsure what the ideal residence time may be. Placing multiple reactors in series is largely equivalent to a single longer flow reactor which may then be used for production at a later stage. Alternatively, the flow reactors 1, 1', 1" may perform different steps in a single reaction and/or process, e.g. a photochemical reaction using a first wavelength in the reactor 1, followed by a photochemical reaction using a second wavelength in the reactor 1', which is followed by a thermal reaction in reactor 1". Moreover, the serial set-up also allows to run pre-processing or post-processing operations such as thermosetting, mixing, liquid-liquid extraction.

The invention claimed is:

1. A flow reactor comprising:
a straight planar process channel having a longitudinal direction and being delimited by a bottom wall, a top wall, two side walls, a first end wall, and a second end wall opposite to said first end wall along said longitudinal direction, the process channel comprising at least one inlet at said first end wall configured to introduce at least one feed stream into said process channel and at least one outlet at said second end wall configured to discharge at least one product stream from said process channel;

a flow generator configured to generate a pulsatile flow within said process channel, the pulsatile flow comprising a unidirectional net flow component through said process channel along said longitudinal direction and an oscillatory flow component superposed on said net flow component; and a plurality of static mixing elements disposed within said process channel and configured to locally split and recombine the pulsatile flow, wherein said mixing elements fill up at least 5% of said internal volume and at most 30% of said internal volume.

2. The flow reactor according to claim 1, wherein said flow generator is configured to generate said pulsatile flow with a velocity ratio of at least 1, where the velocity ratio is the ratio of an oscillatory Reynolds number to a net Reynolds number and is given by $2\pi f x_o/u$ where u is a velocity of the net flow component, f is a frequency of the oscillatory flow component and $x_o$ is a center-to-peak amplitude of the oscillatory flow component.

3. The flow reactor according to claim 1, wherein said mixing elements are further configured to generate vertical vortices within said pulsatile flow.

4. The flow reactor according to claim 1, wherein said top wall comprises at least one transparent part.

5. The flow reactor according to claim 4, wherein a transparent protective cover is disposed on an inside of said top wall, said protective cover protecting at least one of said at least one transparent part.

6. The flow reactor according to claim 4, wherein the flow reactor further comprises at least one irradiation source configured to irradiate a material inside the process channel through said transparent part.

7. The flow reactor according to claim 1, further comprising a heat exchanger in thermal connection with said process channel.

8. The flow reactor according to claim 7, wherein said bottom wall comprises a material having a thermal conductivity of at least 5 W/mK, the bottom wall being part of said heat exchanger.

9. The flow reactor according to claim 8, wherein said bottom wall is provided with a plurality of channels configured to circulate a fluid therethrough, said channels being connected to a heat controller configured to at least one of add heat to and extract heat from said fluid.

10. The flow reactor according to claim 8, wherein said heat exchanger further comprises at least one thermally controlled support element configured to support said process channel with said bottom wall being in thermal contact with said support element, said support element comprising a plurality of channels configured to circulate a fluid therethrough, said channels being connected to a heat controller configured to at least one of add heat to and extract heat from said fluid.

11. The flow reactor according to claim 1, wherein at least one of said side walls comprises a plurality of deflector elements configured to locally deflect said pulsatile flow.

12. The flow reactor according to claim 1, wherein at least said top wall of the process channel is removably attached to the side walls and the end walls of the process channel.

13. The flow reactor according to claim 1, wherein one or more of said top wall, said bottom wall, said side walls, said first end wall, said second end wall and said mixing elements are provided with a coating.

14. The flow reactor according to claim 1, wherein the flow reactor comprises a plurality of inlets distributed along said first end wall and a plurality of outlets distributed along said second end wall.

15. The flow reactor according to claim 1, wherein said mixing elements are formed by at least one removable inlay disposed within the process channel.

16. The flow reactor according to claim 1, wherein said flow generator comprises an oscillator configured to generate said oscillatory flow component with an oscillation frequency of at least 0.01 Hz and of at most 400 Hz, and with an oscillation center-to-peak amplitude within the process channel of at least 1 µm and at most 5 cm.

17. The flow reactor according to claim 1, wherein said mixing elements are provided in said process channel in a density of at least 0.1 mixing element per cm$^2$, and wherein said density is at most 100 mixing elements per cm$^2$.

18. The flow reactor according to claim 1, wherein the mixing elements are separated by a shortest distance from an adjacent mixing element of at least 0.1 mm, said shortest distance being less than 8 mm.

19. The flow reactor according to claim 1, wherein said process channel has a height measured between said top wall and said bottom wall, said mixing elements having a height that is at most equal to said process channel height.

20. The flow reactor according to claim 1, wherein said process channel has an average height measured between said top wall and said bottom wall of at least 0.1 mm, said average height being at most 10 mm.

21. The flow reactor according to claim 1, wherein said process channel has a longest length measured between said first end wall and said second end wall of at least 1 cm, said length being at most 10 m.

22. The flow reactor according to claim 1, wherein said process channel is provided with at least one further inlet connected to a gas chamber, said at least one further inlet comprising a semipermeable membrane.

23. The flow reactor according to claim 1, wherein the mixing elements are distributed throughout the entire process channel.

24. The flow reactor according to claim 1, wherein said process channel further comprises a single straight channel.

25. A method for producing a product stream using the flow reactor according to claim 1, wherein the method comprises the steps of:
providing the flow reactor;
continuously introducing a feed stream into the flow reactor;
generating a pulsating flow within said process channel; and
removing a product stream from said flow reactor.

26. The method according to claim 25, wherein the step of generating a pulsating flow within said process channel comprises generating said pulsatile flow with a velocity ratio at least 1, where the velocity ratio is the ratio of an oscillatory Reynolds number to a net Reynolds number and is given by $2\pi f x_0/u$ where u is a velocity of the net flow component, f is a frequency of the oscillatory flow component and $x_o$ is a center-to-peak amplitude of the oscillatory flow component.

27. The method according to claim 25, wherein the step of generating a pulsating flow within said process channel comprises generating said oscillatory flow component with an oscillation frequency of at least 0.01 Hz, and with an oscillation center-to-peak amplitude of at least 1 µm and of at most 100 cm.

28. The method according to claim 25, wherein the step of generating a pulsating flow within said process channel further comprises generating a plurality of vertical vortices within said pulsating flow.

29. The method according to claim 25, further comprising one of the steps of: heating a material in said process channel and cooling the material in said process channel.

30. The method according to claim 25, wherein the method further comprises irradiating a material in said process channel.

31. The method according to claim 30, wherein the material is irradiated in said process channel to obtain a photochemical reaction.

* * * * *